(12) United States Patent
Chun et al.

(10) Patent No.: US 6,382,953 B1
(45) Date of Patent: May 7, 2002

(54) POWERED ADJUSTMENT CLAMPING FRAME FOR A THERMOFORMING MACHINE AND METHOD FOR POWER ADJUSTING A CLAMPING FRAME SIZE

(75) Inventors: Victor L. Chun, Midland; Roderick P. Schulte, Saginaw; James H. Kundinger, Auburn, all of MI (US)

(73) Assignee: Brown Machine, LLC., Beaverton, MI (US)

( * ) Notice: Subject to any disclaimer, the term of this patent is extended or adjusted under 35 U.S.C. 154(b) by 0 days.

(21) Appl. No.: 09/332,702

(22) Filed: Jun. 14, 1999

(51) Int. Cl.[7] .............................................. B29C 51/26
(52) U.S. Cl. ................. 425/397; 425/171; 425/DIG. 48
(58) Field of Search ........................ 425/DIG. 48, 397, 425/388, 400, 171; 269/119, 121

(56) References Cited

U.S. PATENT DOCUMENTS

| | | | |
|---|---|---|---|
| 2,907,069 A | 10/1959 | Butzko | 425/388 |
| 3,133,314 A | 5/1964 | Arnould et al. | 425/388 |
| 3,287,765 A | 11/1966 | Puente | 425/DIG. 48 |
| 3,599,959 A | 8/1971 | Asenhauer | 269/57 |
| 3,616,494 A | * 11/1971 | Natter | 425/429 |
| 3,841,819 A | 10/1974 | Diamond | 425/388 |
| 3,910,747 A | 10/1975 | Dean et al. | 425/397 |
| 4,018,551 A | 4/1977 | Shuman | 425/388 |
| 4,097,035 A | 6/1978 | Shuman | 269/121 |
| 4,170,449 A | 10/1979 | Shuman | 425/445 |
| 4,938,678 A | 7/1990 | Oulman | 425/397 |
| 5,562,933 A | 10/1996 | Shuman | 425/388 |
| 5,843,492 A | 12/1998 | McCorry | 425/397 |

* cited by examiner

Primary Examiner—Nam Nguyen
Assistant Examiner—Thu Khanh T. Nguyen
(74) Attorney, Agent, or Firm—John R. Benefiel (57) ABSTRACT

Adjustable clamping frames for rotary thermoforming machine have movable sets of clamp supporting members which are driven by selectively engageable drive units to carry out a size adjustment at a station in the thermoforming machine.

9 Claims, 11 Drawing Sheets

POWERED ADJUSTMENT CLAMPING FRAME FOR A THERMOFORMING MACHINE AND METHOD FOR POWER ADJUSTING A CLAMPING FRAME SIZE

BACKGROUND OF THE INVENTION

This invention concerns thermoforming machines of the type in which sheets of plastic from which a part is to formed are clamped in a frame at a loading station, and the frame with the sheet clamped therein is transferred through successive stations in the machine for heating, forming, cooling, unloading, etc.

In a common design for such machines, transfer of the clamping frames through the various stations is carried out by means of a rotary wheel carrier.

The plastic sheet is supported along its edges by a series of clamps arranged along the length of clamping frame members arranged in a rectangular shape.

Thermoforming machines often can be used for producing different parts, requiring different sheet sizes, and for this reason the clamping frame size must usually be changed to match the sheet size required. Heretofore, adjustable size frames have been used, usually requiring carrying out mechanical adjustments of the frame members manually while the frames are in the machine. This is a tedious, slow task, prone to error as the mechanic typically must enter spaces within the machine at locations where making adjustments is awkward.

Alternatively, the frames must be removed from the machine to be replaced with different size frames, or to be reassembled in a different size configuration.

It is the object of the present invention to provide a quicker, easier and less error prone method for adjusting the clamping frame size and a clamping frame used in such method.

SUMMARY OF THE INVENTION

The above object and others which will become apparent upon a reading of the following specification and claims are achieved by use of a pair of selectively engageable drive units, each drive unit used to adjust the spacing of a respective one of an adjustment mechanism associated with each pair of sets of parallel movable members included in the clamping frame. The pairs of movable members together form a rectangular space which receives the sheet to be clamped, and a series of clamp mechanisms on each of the movable members is used to clamp each side edge of the sheet.

The drive units are located at one of the machine stations, and each frame is adjustable upon being transferred therein by the drive units being moved into engagement with a respective adjustment mechanism. Each selectively engageable drive unit includes an output gear, and each unit is slidable to cause the output gear of the drive unit to move into and out of meshing engagement with a respective one of a gear included in each adjustment mechanism carried by each clamping frame. Each of the gears drives to pairs of parallel screw shafts received onto the ends of a respective pair of movable frame members.

The screw shafts are cause to be rotated in synchronism with each other by a cross shaft and pairs of meshing gears fixed to the cross shaft and screw shafts respectively.

The screw shafts have oppositely threaded segments which when rotated drive each engaged end of the movable frame members closer or further apart to carry out a size adjustments.

The selectively engageable drive units is being located in the thermoforming machine at a particular station allows a succession of clamping frames to be adjusted in turn by engagement of the drive units after each clamping frame is transferred to that station.

The powered adjustment may be carried out by an operator observing fixed scales on each frame as the drive motor is activated to shift the movable frame members to verify when a desired size adjustment has been reached.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
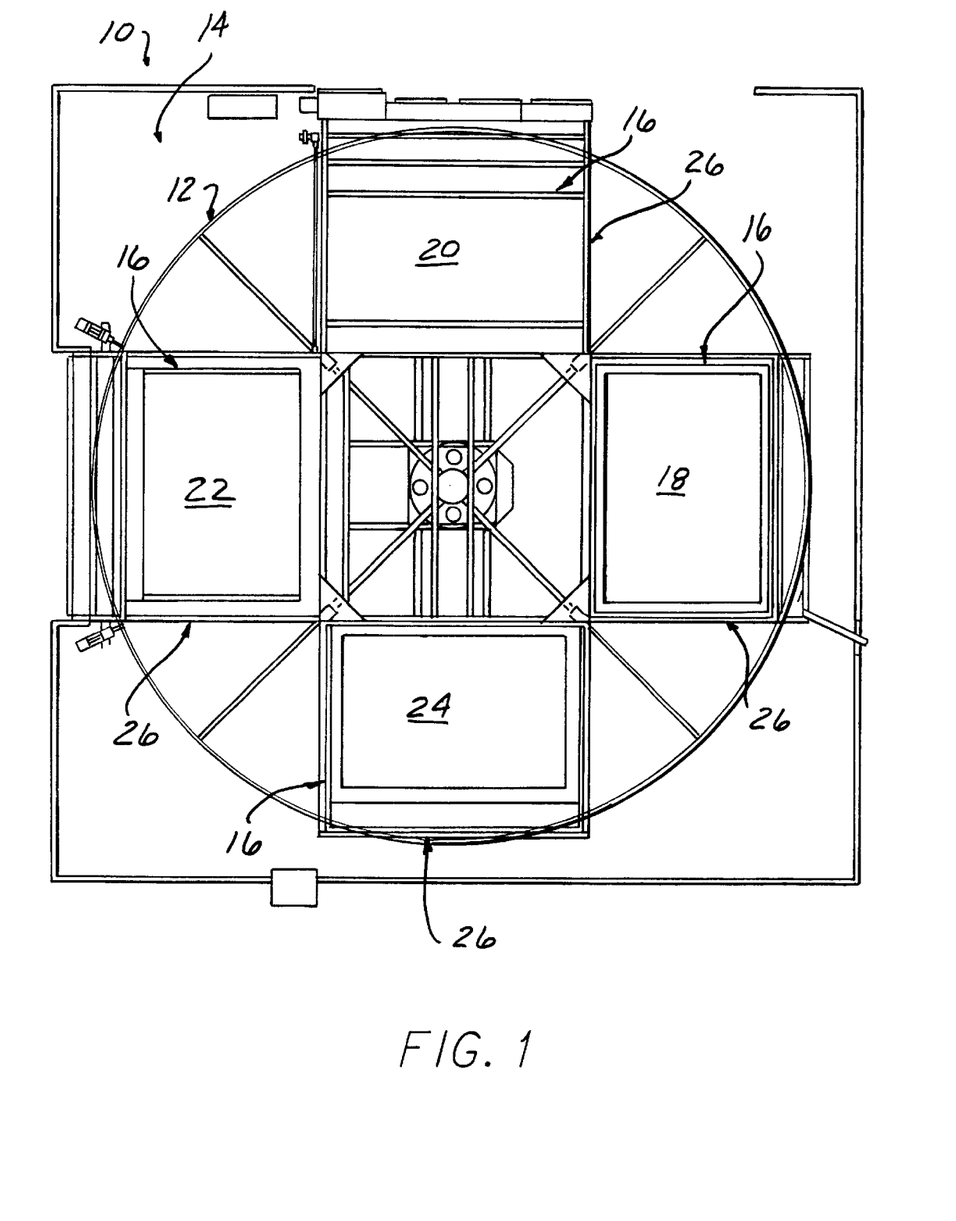
FIG. 1 is a simplified plan view of a rotary transfer thermoforming machine utilizing powered adjustment clamping frames.

Referring to FIG. 1, a rotary transfer machine 10 includes a rotary transfer carrier wheel 12 rotatably driven on a machine frame 14, adapted to carry each of four clamping frames 16 successively through a load/unload station 18, a heating station 20, a forming station 22, and a cooling station 24.

Since such machines are well known in the art, details thereof will not be set forth herein.

This type of machine forms molded parts from thin sheets of plastic by heating the same in the heating station 20 prior to being formed in the forming station 22. The formed part is cooled in the cooling station 24 and then unloaded in the load/unload station 18.

The clamping frames 16 are mounted on seats 26 carried by carrier wheel 12 so as successively position each clamped sheet in each station.

Since thin sheets of plastic oriented in a horizontal position are used, it is necessary to support each sheet about its periphery as it is advanced through the stations by rotation of the carrier wheel 12. This done by a series of clamps arranged around the rectangular space defined within each of the clamping frames 16.

Figure 2:
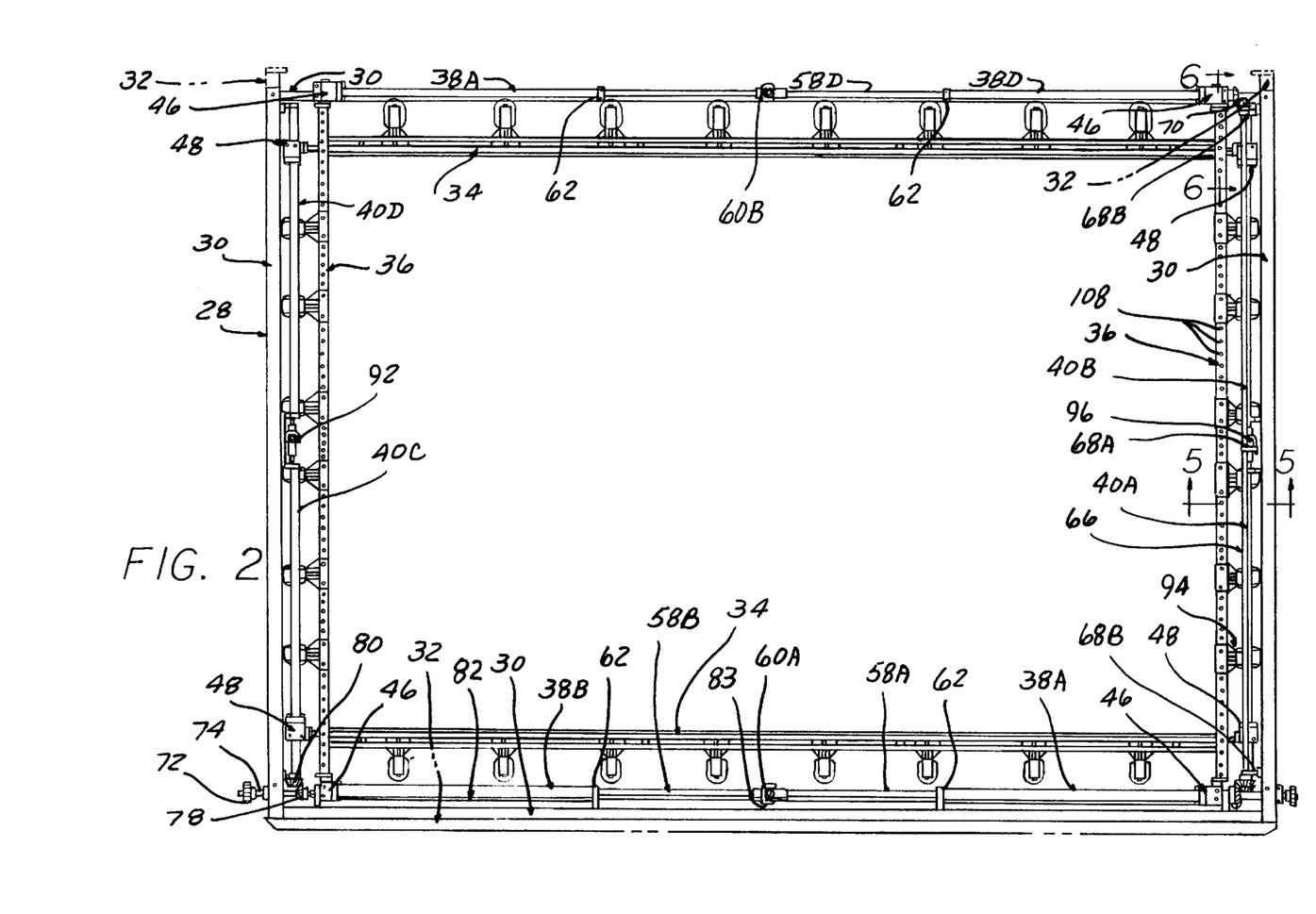
FIG. 2 is a plan view of a powered adjustment clamping frame according to the present invention.

As shown in FIG. 2, the clamping frames 16 each include an outer rectangular fixed frame 28 constructed of rectangular tubing sections 30 welded together and mounted to frame members 32 of the carrier wheel 12 (some of which are shown in phantom lines).

Movably supported within the outer fixed frame 28 are two sets of parallel movable rails, i.e., a pair of spaced apart parallel "X" rails 34, and a pair of movable "Y" rails 36. The movable rails 34, 36 are disposed within the space within the fixed frame tubing members 30, and supported therein by respective pairs of screw shafts 38, 40 rotatably supported on the outer fixed frame 28.

Each of the pairs of screw shafts 38, 40 comprise oppositely threaded segments 38A, 38B; 38C, 38D; 40A, 40B; and 40C, 40D, which are each threadably received through a respective internally threaded carrier nut 46, 48, each of which in turn is attached to a respective end of each of the movable rails 34, 36.

Figure 2A:
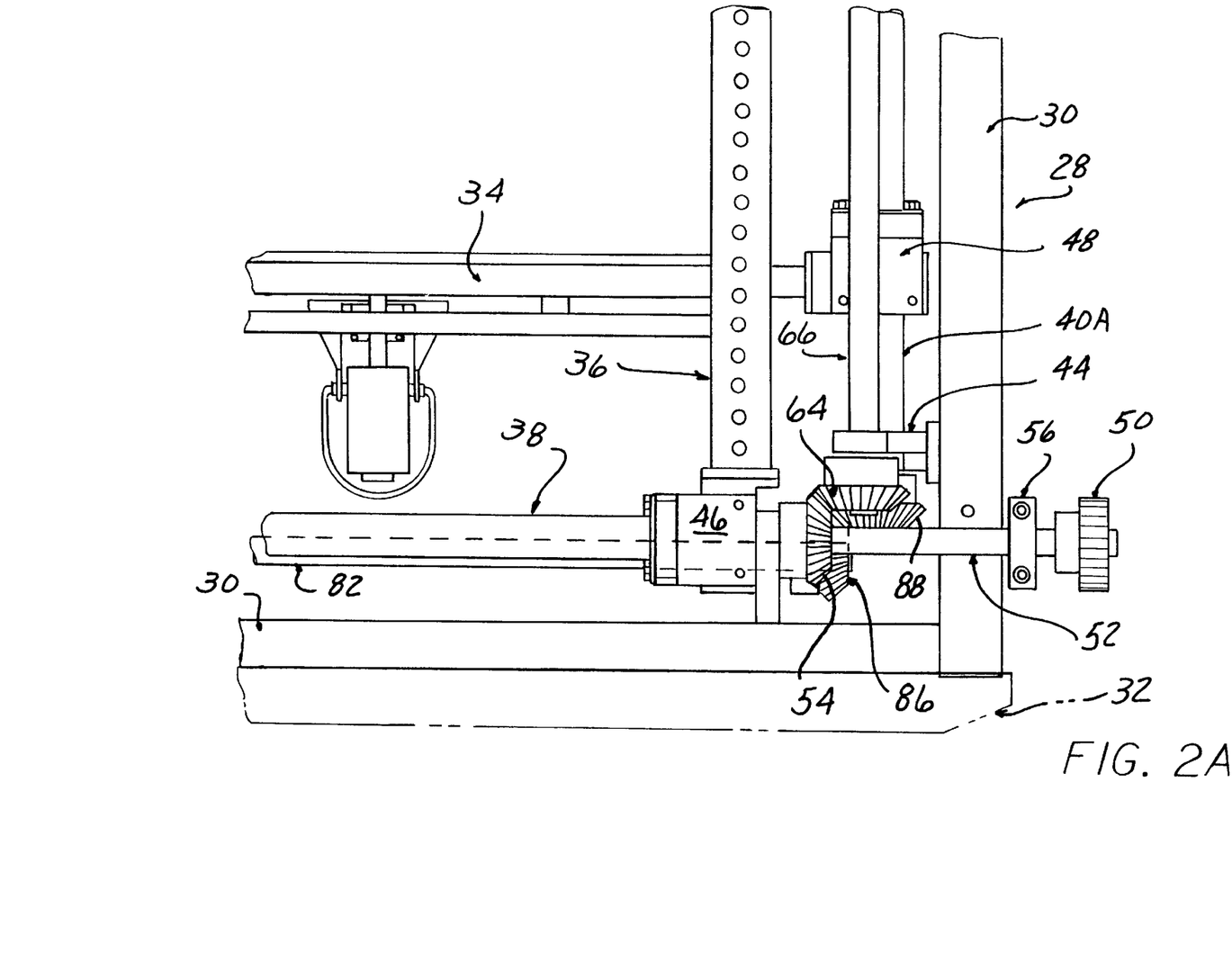
FIG. 2A is an enlarged fragmentary plan view of a portion of the powered adjustment clamping frame shown in FIG. 2.

As seen in FIG. 2A, screw shaft 38A is driven by a spur gear 50 located outside the fixed frame 28 by an extension shaft 52 fixed to a bevel gear 54 and also to one end of the screw shaft 38A. A support bearing block 56 fixed to fixed frame 28 rotatably supports the shaft 52.

A pair of extension shafts 58A, B and 58C, D coupled together with universal joints 50A, 60B, interconnect screw shaft segments 38A, 38C with screw shaft segments 38B, 38D to cause them to rotate together. Support brackets 62 are also attached to fixed frame 28.

Bevel gear 54 mates with a second bevel gear 64 fixed to a cross shaft 66 which extends across frame 28, support 68 at the center, and supports 68 at each end cross shaft 66 has a bevel gear 70 attached to its opposite end meshing with a bevel gear attached to one end to the screw shaft 38D. Thus, drive spur gear 50 drives all of the screw shaft segments 38A–38D, in synchronism with each other, to move rails 36 together or apart while maintaining parallelism.

Figure 2B:
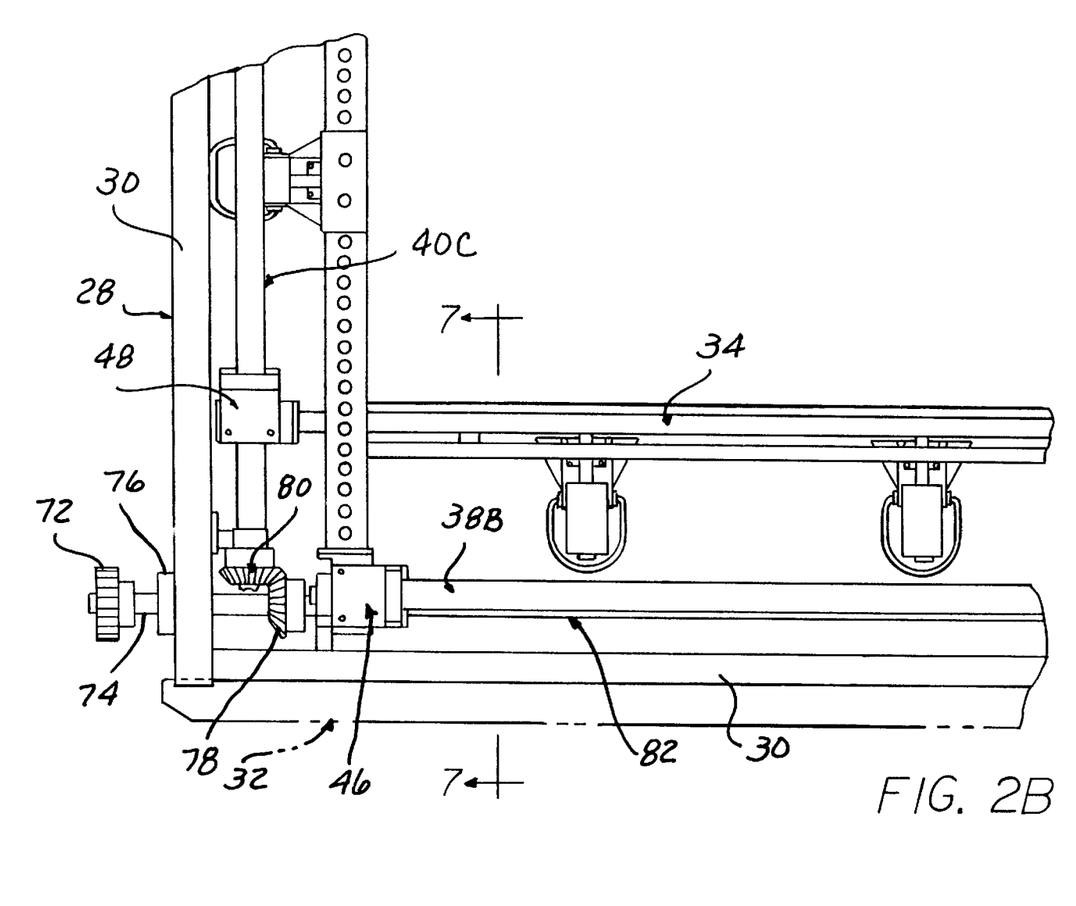
FIG. 2B is an enlarged fragmentary plan view of a portion of the powered adjustment clamping frame shown in FIG. 2.

FIG. 2B shown that a second drive spur gear 72 and shaft 74 projects from the opposite end of the fixed frame 28, supported on a bearing block 76 attached to a frame member 30. Shaft 74 has a bevel gear 78 attached thereto mating with another bevel gear 80 which in turn is fixed to one end of screw shaft segment 40C to drive the same.

Figure 7:
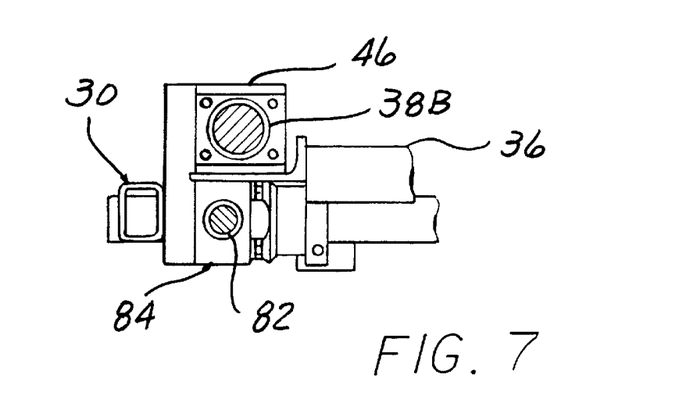
FIG. 7 is a view of the section 7—7 taken in FIG. 2.
Figure 9:
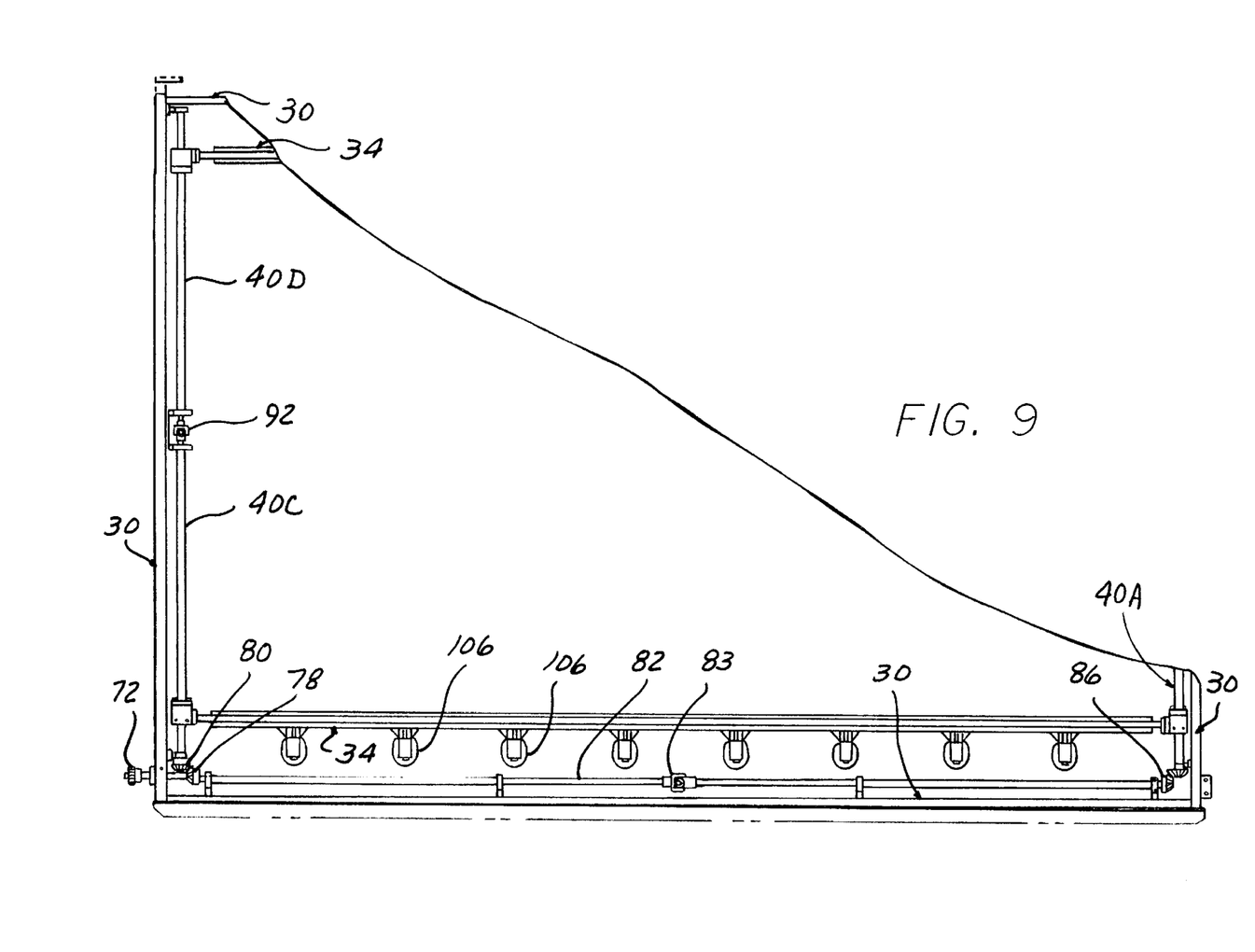
FIG. 9 is a fragmentary plan view of the Y axis rail set of the clamping frame.
Figure 10:
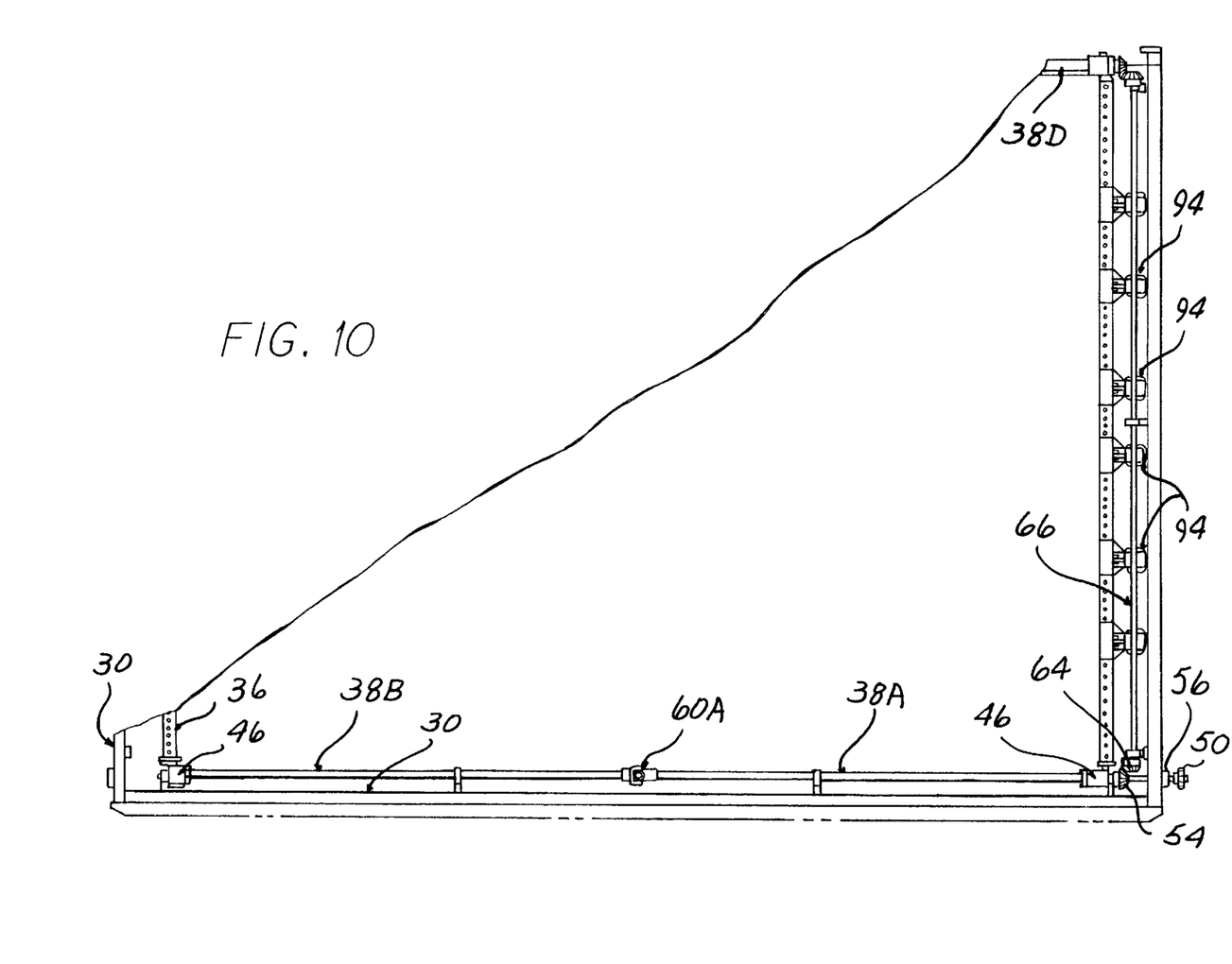
FIG. 10 is a fragmentary plan view of the X axis rail set of the clamping frame.

Shaft 74 is also attached to a two piece cross shaft 82 (best seen in FIGS. 7 and 9) supported on brackets 84. A bevel gear 86 is attached to the opposite end of cross shaft 82 meshing with a mating bevel gear 88 attached to screw shaft segment 40A.

Screw shaft segments 40A, 40B are connected together with U-joints 90 and screw shaft segments 40C and 40D are connected together with U-joints 92.

The drive spur gear 72 rotates all of the screw shaft segments 40A–D in synchronism to cause movement of movable rails 34 together or apart while maintaining parallelism.

Rails 36 are located above the rails 34 to allow the change in spacing of both set of rails 34, 36.

Figure 3:
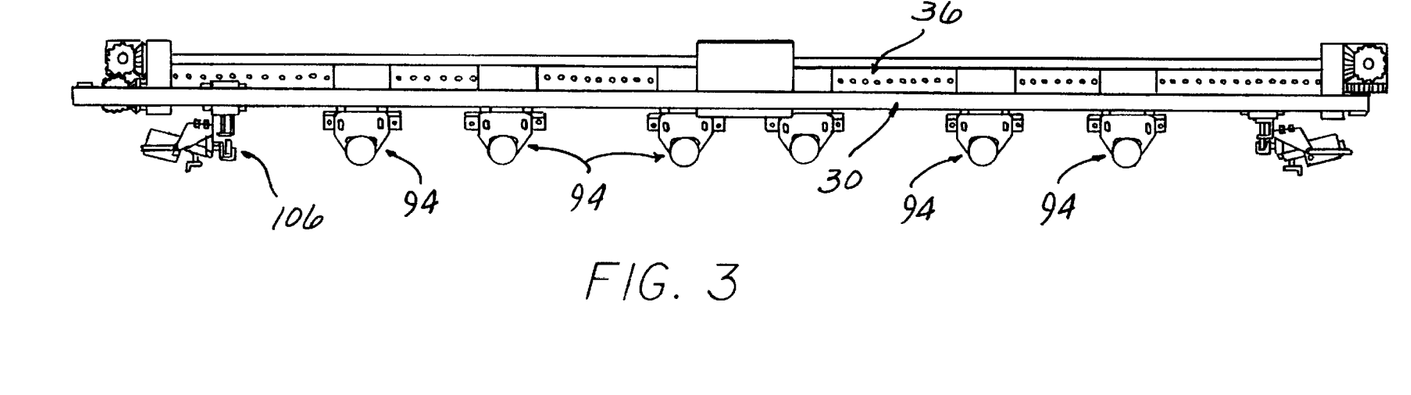
FIG. 3 is a side elevational view of the powered adjustment clamping frame shown in FIG. 2.
Figure 3A:
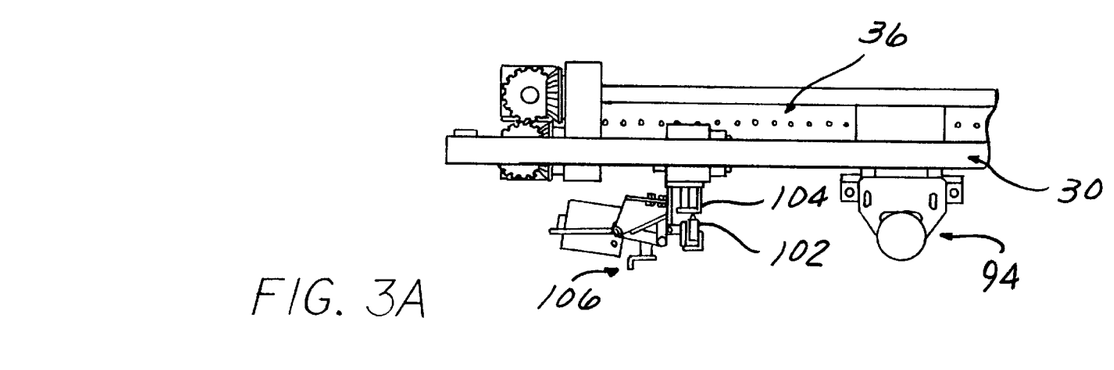
FIG. 3A is a side elevational enlarged view of one of the clamping mechanisms installed on the X-axis movable rails.

Rails 36 have a series of pneumatically operated conventional clamping mechanisms 94 mounted thereto, by a corresponding series of hanger brackets 96 attached to the rails 36 which locate clamping pins 98 and pin rails 100 in the same plane as clamping pins 102 and pin rails 104 of clamping mechanisms 106 mounted to movable rails 34.

The pin rails 100 and 104 lie in the same plane, as the bottom sides thereof define the surface against which the sheet material is clamped. Thus, the pin rails 100, 104 cannot move into each others space in the same fashion as can be done by the stacked sets of movable rails 34, 36. Thus, the "short" pin rails 104 may be cut to the shortest width to which an adjustment is contemplated. For this reason, the movable rails 36 have a series of holes 108 to allow easy removal and/or changes in spacing of the clamping mechanisms 94 for different widths of sheet.

The full array of clamping mechanisms 106 on rails 34 are usually operated no matter the length of a particular sheet size.

Figures 4, 13, 14:
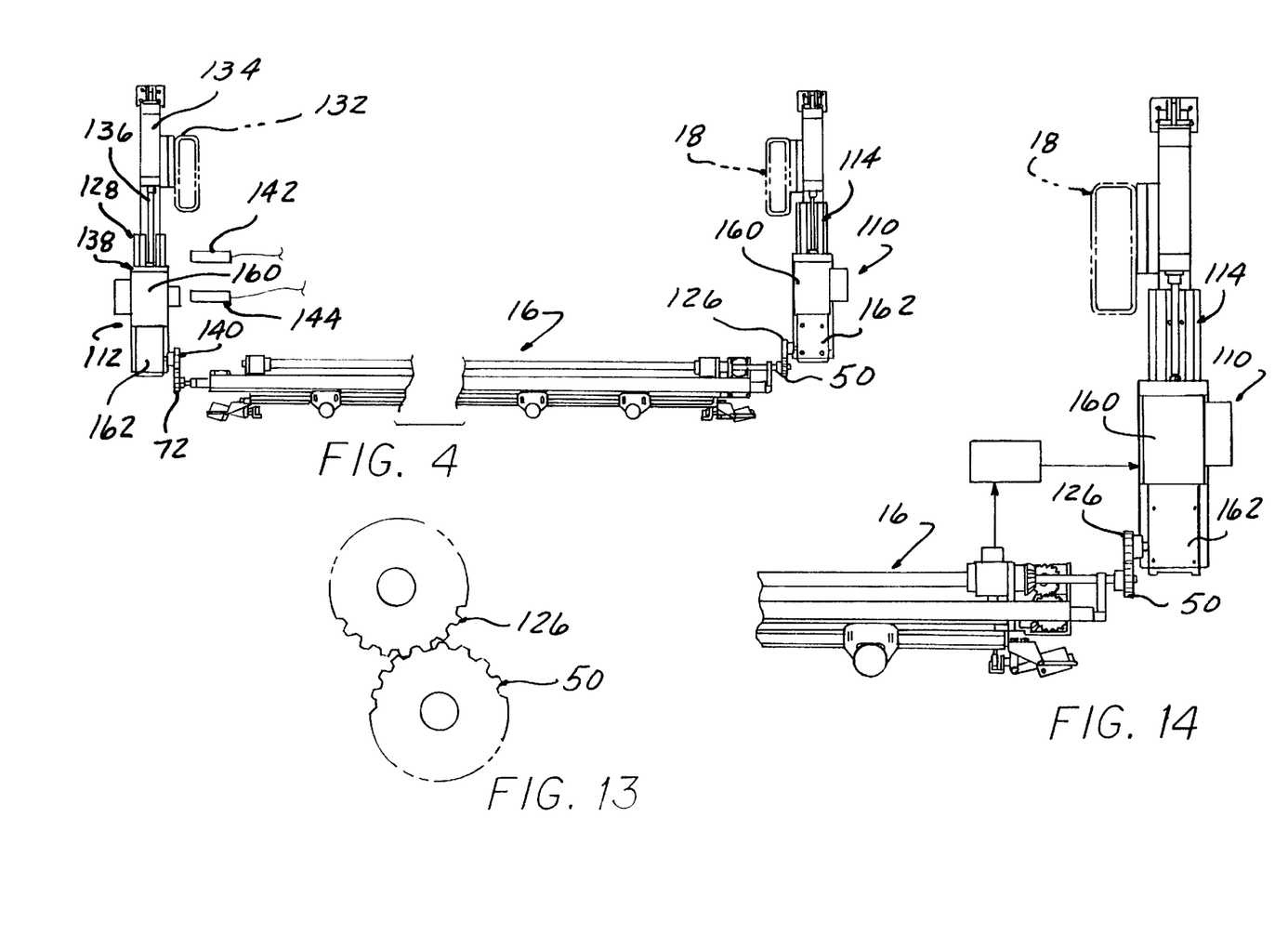
FIG. 4 is a front elevational view of the powered adjustment clamping frame shown in FIG. 2, showing engagement of drive units for the respective adjustment mechanisms for each rail set of the clamping frame.
FIG. 13 is an elevational view of meshing spur gears used to engage the rail set drive.
FIG. 14 is a fragmentary elevational view of a portion of a clamping frame with a diagrammatic representation of a servo drive for the adjustment drive.
Figure 5:
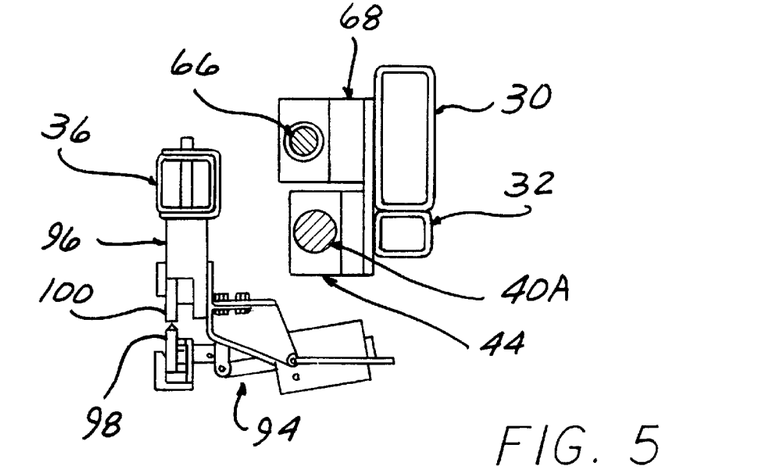
FIG. 5 is a view of the section 5—5 taken in FIG. 2.
Figure 6:
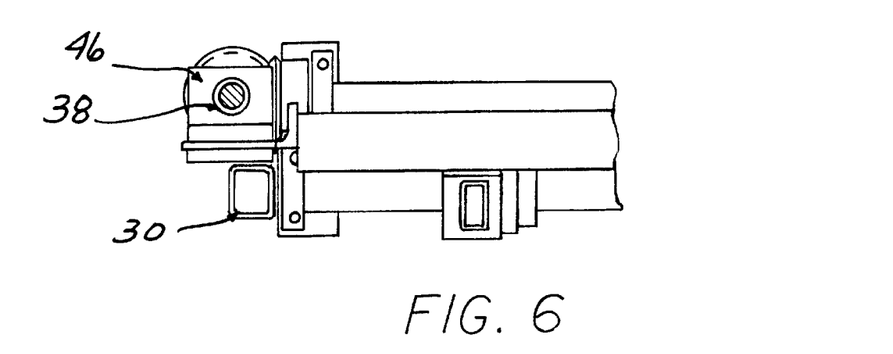
FIG. 6 is a view of the section 6—6 taken in FIG. 2.
Figure 11:
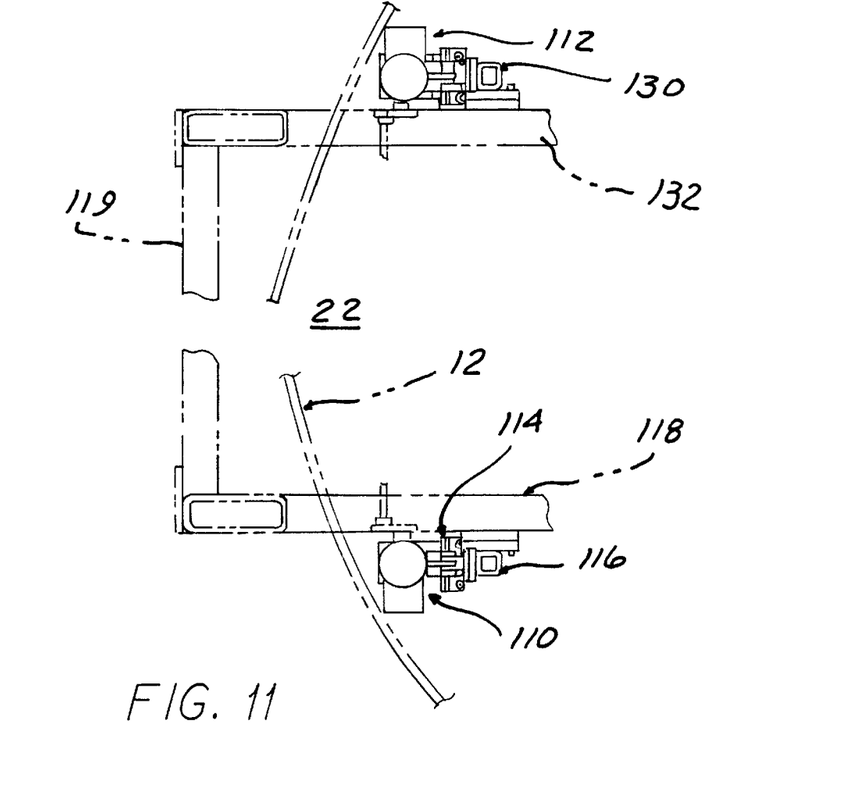
FIG. 11 is a fragmentary plan view of portions of the thermoforming machine and the disengageable drive for each of the respective clamping frame movable rail sets.
Figure 12:
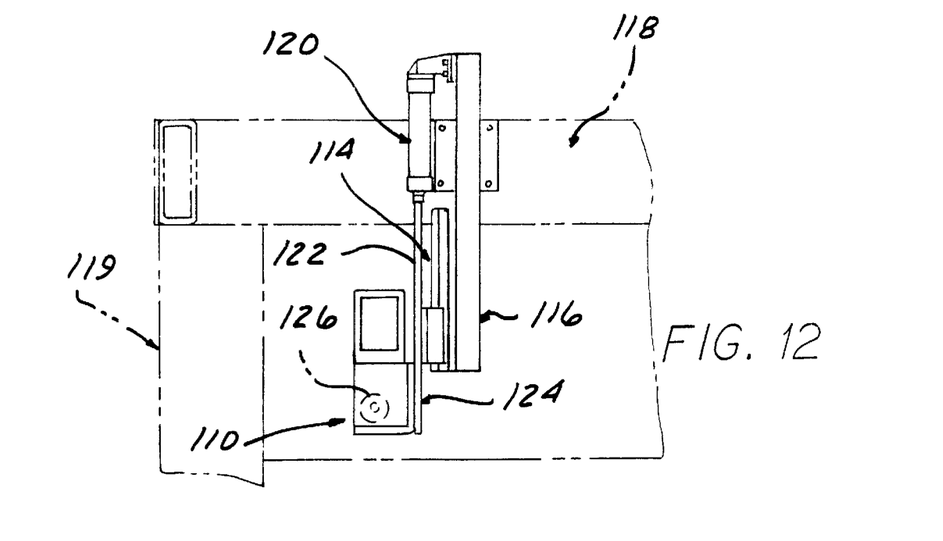
FIG. 12 is a side elevational view of one of the drive units shown in FIG. 11.

FIGS. 4, 11 and 12 show the respective disengageable drive units 110, 112 for powering the adjustment of the movable rail sets 34, 36.

The drive units 110, 112 are shown located at the forming station 22 to allow each separate clamping frame 16 to be adjusted successively by the same common drive units 110, 112, but could also be located elsewhere in the machine.

Drive unit 110 is movable vertically on a guide structure 114 supported by a square tube post 116 held on a member 118 of the machine frame 119.

A power cylinder 120, also mounted to post 116 has an operating rod 122 connected to a slide bed 124 holding the drive unit 110, allows powered movement up and down of the drive unit 110 to engage or disengage an output gear 126 with gear 50 on each clamping frame 16.

Drive unit 112 similarly is movable vertically on a guide structure 128 mounted to a post 130 attached to a frame member 132.

A power cylinder 134 has an operating rod 136 coupled to a slide bed 138 on which is mounted the drive unit 112 so as to power movement up and down to disengage or engage an output spur gear 140 with gear 72 on the clamping frame 16. The spur gear sets 126, 50 and 140, 72 are offset as shown in FIG. 13 to insure that meshing engagement of the gears is achieved as the respective drive units 110, 112 are driven down.

Preferably, detectors 140, 142 are used to provide a signal to the operator that the gears are engaged, and/or to provide a safety interlock preventing attempted rotation of the carrier wheel 12 when the drive units 110 or 112 are engaged.

The drive units 110, 112 are preferably combinations of an electric motor and a gearbox 162.

Figure 8:
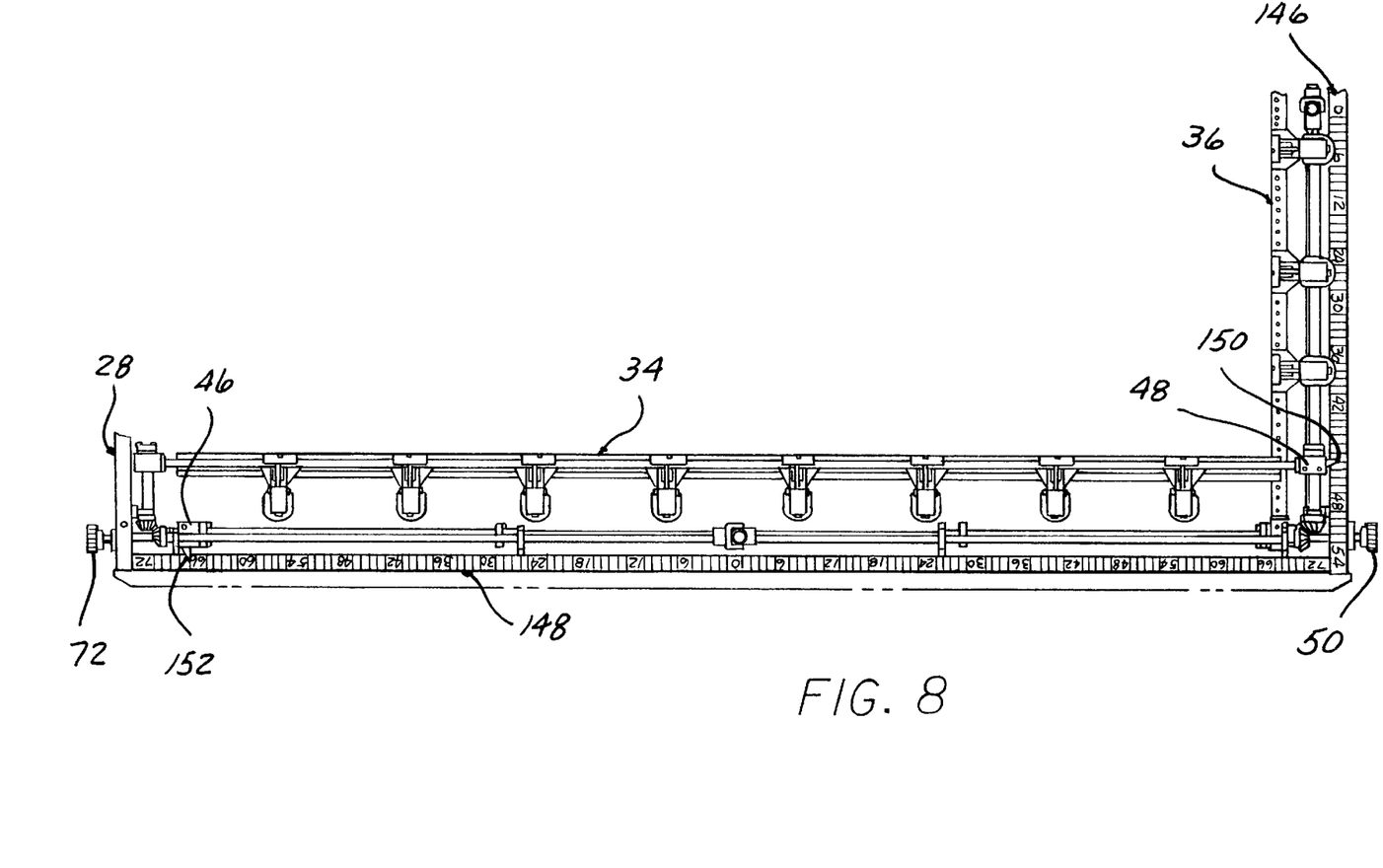
FIG. 8 is a fragmentary bottom plan view of the clamping frame in a direction looking up at the bottom of the clamping frame showing attached scales for each movable rail set.

FIG. 8 shows respective scales 146, 148 connected to the fixed frame 28, with suitable pointers 150, 152 provided on the carrier nuts 46, 48, allowing the operator to determine when a desired champing frame size adjustment has been reached.

FIG. 14 shows an alternative arrangement in which a transducer 154 provides a signal to a controller 156 controlling the drive motor 160 to automatically drive the rail sets 34, 36 to a desired adjustment.

What is claimed is:

1. A thermoformer machine comprising:

a machine frame having a plurality of stations defined therein;

at least one rectangular clamping frame including an outer rectangular fixed frame, defining a rectangular space, two sets of spaced apart but parallel movable frame members mounted to said rectangular fixed frame, said sets of movable frame members extending orthogonally to each other to define a rectangular space within which said sheet is received;

a series of clamps arranged along each of said movable frame members to clamp a sheet of plastic therein;

a transfer mechanism for carrying said at least one clamping frame successively through said stations;

each set of movable frame members mounted on supports on said fixed frame and engaged by a respective adjustment mechanism when operated causing adjusting movement of said movable frame members towards and away from each other to adjust the size the rectangular space defined by said movable frame members; and a pair of powered drive units on said machine at one of said stations, each powered drive unit selectively engageable or disengageable with a respective adjustment mechanism on said clamping frame for each set of movable frame members to enable selective powered driving of each of said sets of movable frame members towards or away from each other to a desired spacing from each other.

2. The machine according to claim 1 wherein each of said movable frame members have opposite ends supported on a respective one of two pairs of parallel screw shafts comprising said supports on said fixed frame, said screw shafts rotatably mounted to said fixed frame, each end of each movable member fixed to a respective carrier nut member threaded onto one of said screw shafts so as to carry said members towards or away from each other upon rotation of said screw shafts; said powered drive units when activated rotating each respective pair of screw shafts when engaged with a respective adjustment mechanism.

3. The machine according to claim 2 wherein each powered drive unit includes an output gear, and wherein each of said clamping frame adjustment mechanisms has a gear drivingly connected to one pair of screw shafts to rotate the same simultaneously when a respective gear is rotated; said powered drive unit output gears moved into meshing engagement with said adjustment mechanism gear when said drive units respectively engage said clamping frame adjustment mechanisms.

4. The machine according to claim 3 wherein said pairs of parallel screw shafts are each drivingly connected with respective cross shafts so as to rotate in unison with each other.

5. The machine according to claim 3 wherein each drive unit output gear is offset with respect to said corresponding adjustment mechanism gear engaged thereby to facilitate engagement thereof.

6. The machine according to claim 3 wherein each of said powered drive units comprise a drive motor and gearing unit mounted to a guide to be movable, and further including an actuator for moving said motor and gear unit on said guide to engage or disengage said drive unit and adjustment mechanism gears.

7. The machine according to claim 1 wherein a measuring scale is mounted on each of two orthogonal members of said fixed frame to allow a visual determination of the spacing of each pair of movable members.

8. A thermoforming machine of a type having a series of stations, and at least one rectangular clamping frame having a series of clamps mounted along each member of two pairs of parallel movable members, each pair arranged orthogonally to define a rectangular space configured to receive a plastic sheet, said sheet of plastic releasably clamped in said clamping frame by said clamps, and a transfer mechanism for moving said clamping frame through said stations for processing said sheet of plastic into a part, the improvement comprising:

an adjustment mechanism incorporated in each of said clamping frames for each pair of movable members enabling a spacing adjustment to be carried out on each pair of movable frame members, each adjustment mechanism including a drive element and two adjustment powered drive units on said machine selectively movable to bring an element thereof into driving engagement or out of engagement with said drive element of a respective one of said adjustment mechanisms when one of said clamping frames is moved to a particular location in said machine, said powered drive units each including a motor which energized causes operation of a respective one of said adjustment mechanism on said at least one clamping frame when said drive unit element is engaged with a respective adjustment mechanism drive element.

9. A method of adjusting the size of a series of clamping frames used to clamp a sheet of material for transfer through stations of a thermoforming machine, comprising the steps of adjustably supporting two orthogonally related sets of clamp mounting members within said clamping frames so as to be drivable to vary the spacing therebetween; and selectively driving each set of movable members of each clamping frame with a selectively engageable and disengageable common powered drive unit located at one of said stations to obtain a desired spacing of said clamping members to achieve a selected frame size.

* * * * *